US007719215B2

(12) United States Patent
Meewis et al.

(10) Patent No.: US 7,719,215 B2
(45) Date of Patent: May 18, 2010

(54) SYSTEM AND METHOD FOR CONTROLLING MOTORIZED WINDOW COVERINGS

(75) Inventors: Henk Jan Meewis, Arvada, CO (US); James L. Miller, Henderson, CO (US)

(73) Assignee: Hunter Douglas Inc., Upper Saddle River, NJ (US)

( * ) Notice: Subject to any disclaimer, the term of this patent is extended or adjusted under 35 U.S.C. 154(b) by 316 days.

(21) Appl. No.: 11/845,686

(22) Filed: Aug. 27, 2007

(65) Prior Publication Data

US 2008/0047673 A1 Feb. 28, 2008

Related U.S. Application Data

(60) Provisional application No. 60/823,723, filed on Aug. 28, 2006.

(51) Int. Cl.
*H02P 7/00* (2006.01)

(52) U.S. Cl. ...................... 318/280; 318/286; 318/466; 318/468; 160/84.02; 160/84.05

(58) Field of Classification Search ................ 318/280, 318/283, 286, 466, 467, 468; 160/84.02, 160/166.1, 167 R, 168.1 P, 84.05
See application file for complete search history.

(56) References Cited

U.S. PATENT DOCUMENTS

| | | | | |
|---|---|---|---|---|
| 4,554,762 | A * | 11/1985 | Anderson | 49/74.1 |
| 4,856,574 | A * | 8/1989 | Minami et al. | 160/168.1 R |
| 6,116,320 | A * | 9/2000 | Peterson | 160/84.02 |
| 6,297,604 | B1 * | 10/2001 | Mao | 318/445 |
| 6,299,115 | B1 | 10/2001 | Kovach et al. | |
| 6,708,750 | B2 * | 3/2004 | Collett et al. | 160/84.02 |
| 7,401,634 | B2 * | 7/2008 | Kovach et al. | 160/121.1 |

* cited by examiner

*Primary Examiner*—Bentsu Ro
*Assistant Examiner*—Thai Dinh
(74) *Attorney, Agent, or Firm*—Dorsey & Whitney LLP

(57) ABSTRACT

A system and method for controlling any number of devices, such as one or more window shades, using a control system that can be connected to a wall switch by using only two wires. The various embodiments of the present invention enable a user to control a shade while using a motor that is controlled by use of two power lines.

20 Claims, 7 Drawing Sheets

SYSTEM AND METHOD FOR CONTROLLING MOTORIZED WINDOW COVERINGS

CROSS-REFERENCE TO RELATED APPLICATION

The present application claims benefit under 35 U.S.C. § 119(e) to U.S. Provisional Patent Application No. 60/823,723 ("the '723 application"), which was filed on Aug. 28, 2006 and entitled "SYSTEM AND METHOD FOR CONTROLLING MOTORIZED WINDOW COVERINGS." The '723 application is incorporated by reference into the present application in its entirety.

INVENTIVE FIELD

The various embodiments of the present invention relate to control systems for various types of apparatus. More specifically, apparatus, processes, systems and methods for using a two wired control system to control the operation of a window covering is provided.

BACKGROUND

Systems for controlling devices distributed throughout an office building, factory, home or other location have become desirable over the past several years. Such systems commonly utilize a wall switch to directly control the operations and functions of one or more devices. The devices can be connected to and used to control one or more appliances (i.e., lights, shades, awnings, and others). Commonly, wall switches are connected to appliances with only two wires, with other wires extending from the switch to a power source. However, currently available appliances commonly utilize and require multiple connections to control panels in order to control the functions and operation of an appliance. For example, a window covering is often connected, using five wires, to control panels that power the window covering up and down (and/or open and closed), tilt vanes in the window covering, and the like. When installed in an existing structure, such as a home or office, five wire connections must be added before a control panel can be used to provide hard wired control of the window coverings. Adding these five wire hard-wired connections can add significant expense to any window covering installation project.

Further, many existing window coverings 115 (and/or other appliances) are often connected by a two wire connection 125 to a wall switch 125, which when "closed" provides power to the window covering. These two wire connections, however, commonly provide for only limited functionality such as moving the window covering up/down (i.e., opening or closing the window covering) by controlling the duration and polarity of a current flowing through a motor provided with the window covering. As shown in FIG. 1, in order to provide additional control features, such as vane tilt control, an adapter 100 can be added. Such adapters 100 commonly include at least two and often three or more additional control wires 105 that are also often connected to a switch or a control panel 110.

Further, existing installations of motorized window coverings commonly require separate control systems for each window covering. Such control systems also commonly require multiple wires extending from a control panel, such as one mounted in a wall, to the motor(s) used to control the window covering.

Thus, a need exists for an apparatus, system and method for controlling one or more window coverings or other apparatus using a switch that is connected to the window covering(s) by only two wires.

SUMMARY

The various embodiments of the present invention provide systems and methods for controlling any number of devices using a control system that can be connected to a wall switch by using only two wires. The various embodiments of the present invention enable a user to control a shade while using a motor that is controlled by use of two power lines.

One embodiment of the present invention takes the form of a control system for use in controlling the extension and orientation of a window covering, including: at least one vane moving element operative to adjust a position of a plurality of vanes in the window covering; a shaft connected to the motor; one or more optical or magnetic switches operably coupled to the shaft and operative to detect at least rotation of the shaft; a dipole switch; a control circuit operably connected to the dipole switch; wherein the control circuit is configured to determine the direction and duration of current flow from the switch to the at least one vane moving element and further operable to control extension and rotation of the vanes in the window covering.

Yet another embodiment of the present invention takes the form of a method for adjusting a covering for an architectural opening, including the operations of: obtaining a current position for the covering; receiving a control signal; determining if the control signal is constant for at least a minimum time; in the event the control signal is constant for at least the minimum time, adjusting the covering in a first manner; determining if a limit on the position of the covering has been reached; in the event the limit on the position of the covering has been reached, stopping adjusting the covering in the first manner; and recording a final position of the covering.

DESCRIPTION OF THE DRAWING FIGURES

DETAILED DESCRIPTION

The various embodiments of the present invention provide systems and methods for controlling any number of devices using a control system that can be connected to a wall switch by using only two wires. The various embodiments of the present invention enable a user to control a shade while using a motor that is controlled by use of two power lines.

Figure 1:
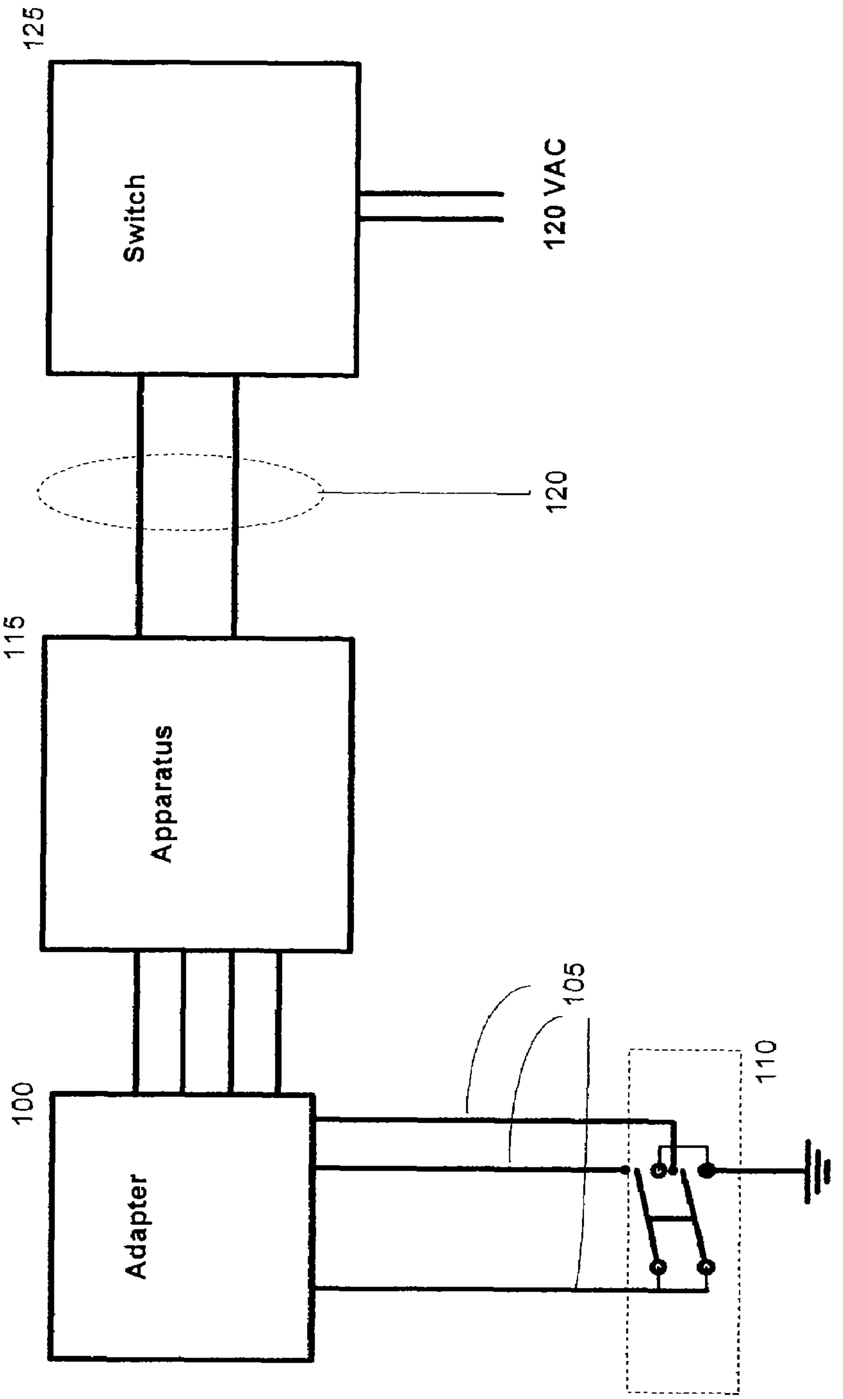
FIGURE 1 (PRIOR ART)
FIG. 1 is a schematic representation of a prior art implementation of using an adapter to provide additional functionality to a window covering.
Figure 2:
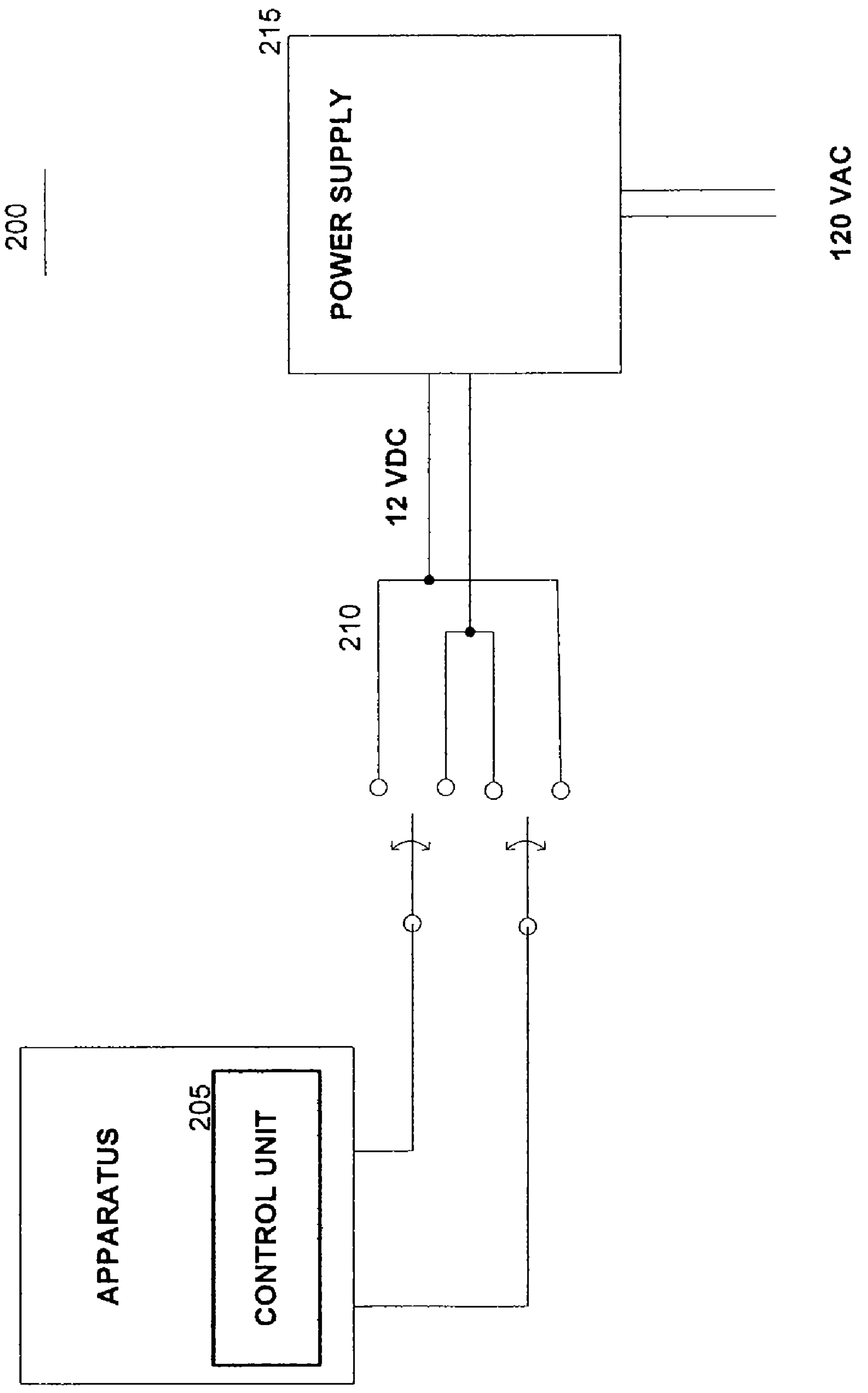
FIG. 2 is a schematic representation of the implementation of one embodiment of the control system of the present invention using a two wire connection to a control switch.

As shown in FIG. 2 for at least one embodiment 200 of the present invention, a control system 205 is provided which can be connected, directly or indirectly, to one or more appliances (not shown), such as new or existing window coverings (for example, window coverings as described in U.S. Pat. No. 6,299,115, the entire contents of which are incorporated herein by reference), audio/video equipment, industrial process equipment, security system components, or otherwise. The control system can be integrated into the appliance itself, suitably attached thereto, or otherwise used to control the operation of a window covering. A power supply can be used to convert line voltages, such as the common 120 V, 60 Hz alternating current ("VAC") used in the U.S., to a desired operating voltage for the control system, such as 12 volts direct current ("VDC"). Other voltages, however, can be used in other embodiments of the invention. Also, instead of line power, the control system can be powered via batteries, solar cells, capacitive systems, combinations of the foregoing and otherwise.

A dual pole, dual throw switch 210 can be used to facilitate the providing of electricity to the control system from the power supply 215. The switch 210 desirably operates in three states: forward (with forward current flow), off (with no current flow) and reverse (with reverse current flow). These currents are desirably used to power a motor to rotate in a clockwise, none or counter clockwise rotation, respectively. As shown in FIG. 2, the switch is "downstream" of the power supply. It is to be appreciated, however, that the relative positions of the switch and the power supply with respect to the source of electrical energy can be reversed, as desired. Such reversal may be desired, for example, when preexisting wiring (which is directly connected to an electrical source) is used.

Figure 3A:
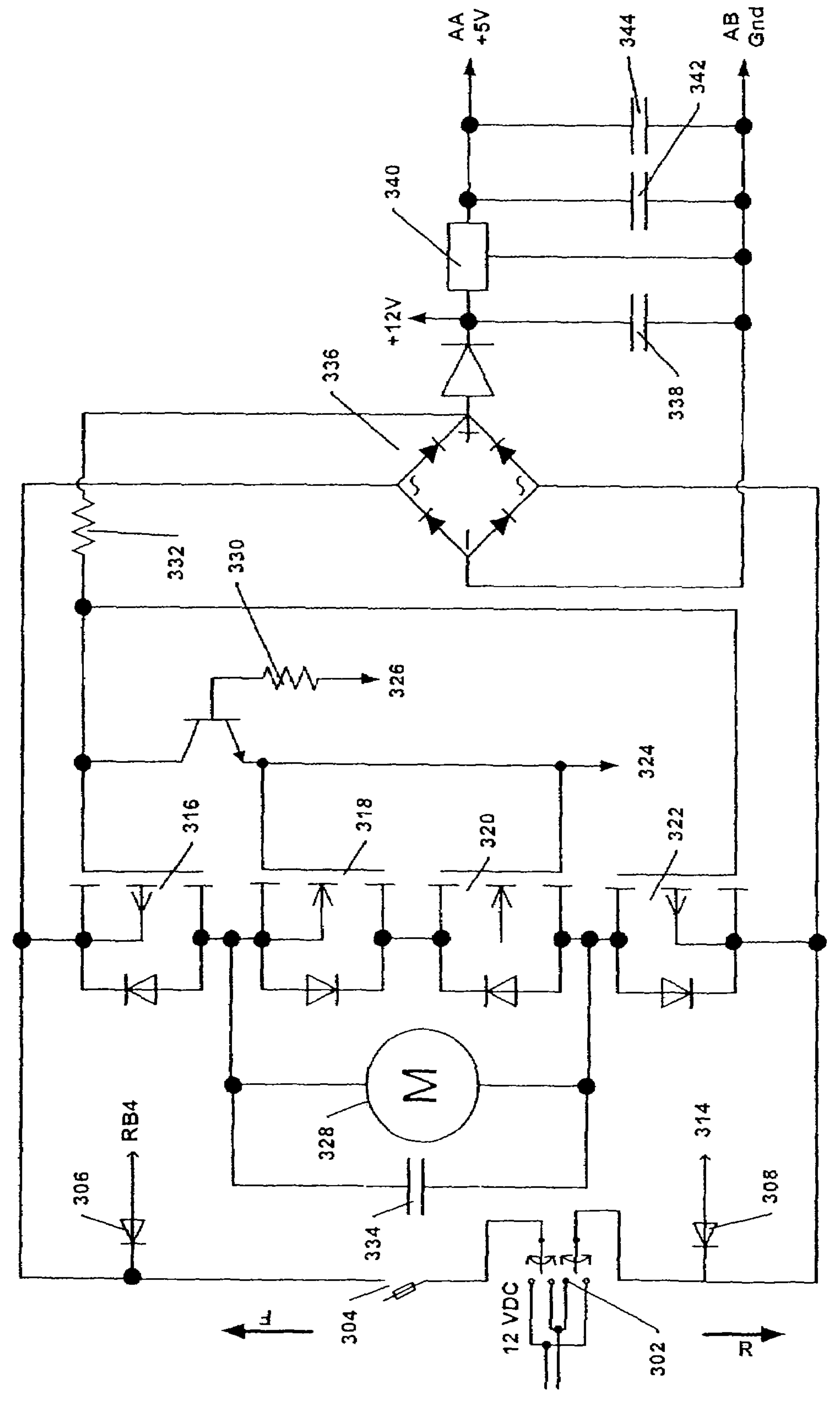
FIGS. 3A and 3B are an electrical diagram of one embodiment of a control system for use with the various embodiments of the present invention.
Figure 3B:
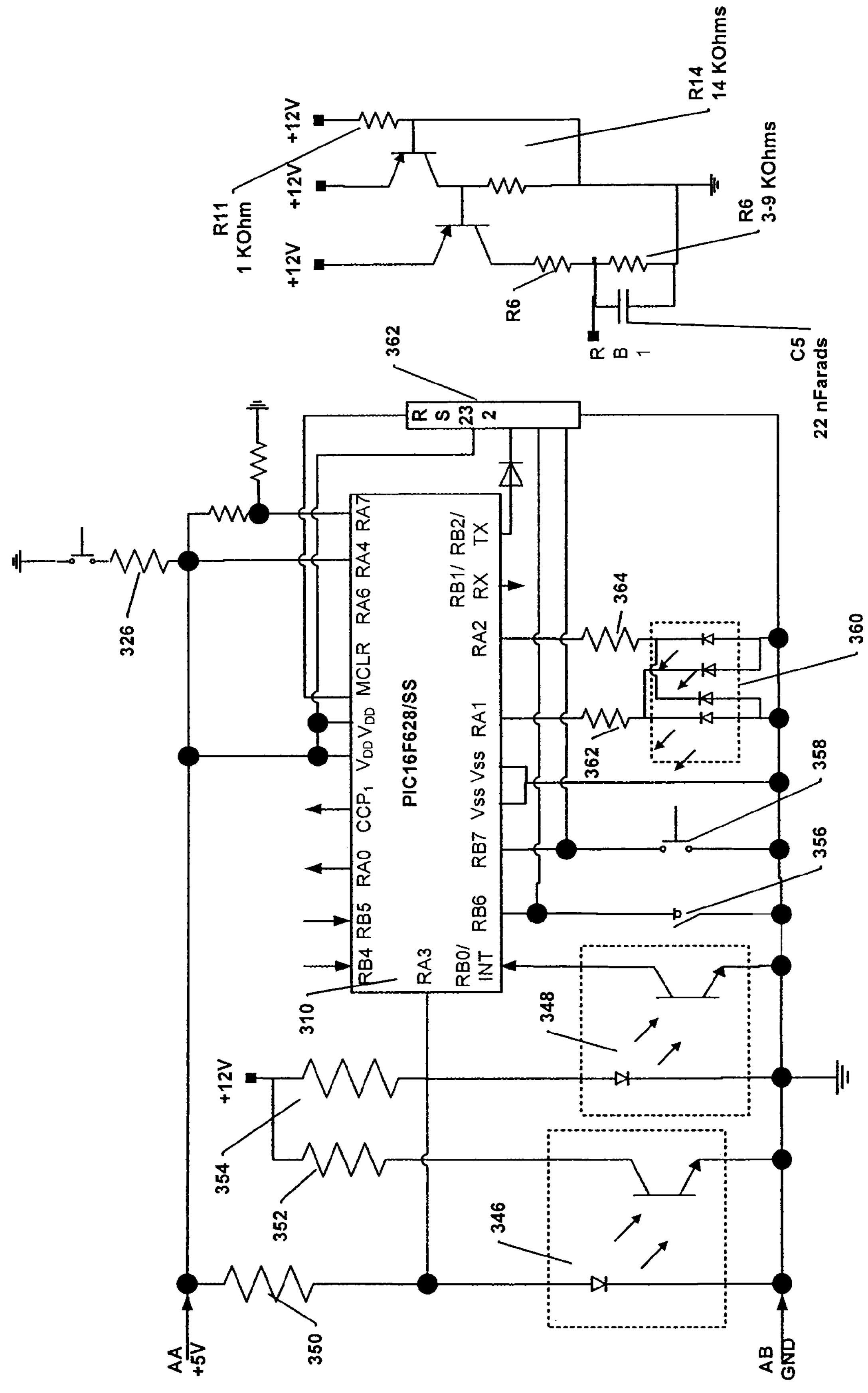

Referring now to FIGS. 3A and 3B, a schematic diagram of a control system 300 for one embodiment of the present invention is shown. In this embodiment, the switch 302 provides 12 VDC power to the control system 300 in one of two flow directions, forward "F" and reverse "R" (which in one embodiment correspond to clockwise and counter clockwise rotation of a motor used to open and close the window covering and also used to tilt vanes in a window covering). A fuse, 304, limits the amount of current in the control system. For one embodiment, the current is limited by fuse 304 to 2 amps.

Diodes 306 and 308 provide current isolation to the processor 310 (shown in FIG. 3B). When the switch 302 is closed (in either the clockwise or counter clockwise position) terminals 312 and 314, respectively, go "high" (as determined by the polarity of the input voltage) and thereby signal the processor 310 that movement of the window covering is to commence. Diodes 306 and 308 provide a ground to the line (312 or 314) which is not "high." As discussed later, the processor records the current position of the shade at this time in an on-board memory device, such as an EEPROM. The EEPROM can be used to store position and limit (high, low, in-between) information. Further, as the control system 300 raises/lowers (opens/closes) the window covering, position and limit information can be real time updated by the processor and stored in the EEPROM. As such, the control system 300 provides for real-time adjustments of position and limit information and desirably eliminates and/or reduces the need to recalibrate the limits for any given window covering.

The control system further includes four transistors 316, 318, 320, 322 which provide for motor control and braking operation control (used to slow down and/or stop a moving window covering). The operation of the motor (via the transistors 316, 318, 320, 322) is controlled by the processor 310 via control line 324 and line 326. Specifically, when the processor 310 desires to drive the motor (so as to raise and/or lower the window covering), line 326 goes "high," transistor 316 or 322 is energized and electricity flows through the motor 328 in either the forward F or reverse R direction. For one embodiment of the invention, transistors 316 and 322 are NDS9953A's and are manufactured by Fairchild Semiconductor, resistor 330 has a resistance of 4.7 kiloohms, and resistor 332 has a resistance of 10 kiloohms. Other transistors, resistors and the like can be used in other embodiments of the present invention.

Similarly, when control line 324 is energized, the gates of transistors 318 and 320 are powered (the gates of transistors 316 and 322 are non-powered) and the current previously flowing in the forward or reverse direction is short circuited and thereby enables the motor to stop the movement of the window covering. For one embodiment, transistors 316 and 322 are NDS9956A's manufactured by Fairchild Semiconductor. Thus, for at least this embodiment of the present invention, motor 328 operates as both an initiator and as a brake of window covering movement. In other embodiments, one or more additional motors, brakes or the like can be used to control the movement of the window covering. Further, capacitor 334 provides power conditioning to the motor and desirably provides for the smooth providing of electrical current to the motor during operation of the same.

The control system also includes a bridge rectifier 336 that controls the polarity of the control system's power supply. Also, capacitor 338 provides a smoothing of the 12 VDC signals output by the bridge rectifier 336. Capacitor 338 desirably has a sufficient capacitance to allow the processor 310 to apply the brakes and stop window covering movement when the power source is otherwise terminated via operation of switch 302. In one embodiment, a 220 micro Farad capacitor, rated at 12 volts, is used as capacitor 338.

Control system 300 also includes a voltage regulator 340 which reduces the 12 VDC output from the bridge rectifier 336 to 5 VDC; this output is provided to processor 310. Capacitors 342 and 344 provide for signal conditioning. In one embodiment, the voltage regulator 340 is an L4G31CZ50, manufactured by Seiko. Also for one embodiment, capacitors 342 and 344 are rated for 5 volts and desirably have a capacitance of 10 micro Farads and 0.1 micro Farads, respectively. Again, other transistors, voltage regulator and capacitors can be used in other embodiments of the present invention.

As mentioned above, control system also includes a processor 310 which, for at least one embodiment, is desirably an 16F628A manufactured by Microchip. The processor 310 desirably includes pins for 16 inputs/outputs.

The processor 310 also desirably includes (or is in connected to) a non-volatile memory storage device, such as an EEPROM. Volatile memory devices can be used in other embodiments. An alternate power supply, such as a battery, can be used to secure the contents of volatile memory devices whenever line power to the control system is interrupted.

The control system 300 also can be configured to include one or more position and/or rate sensors, such as optical or magnetic switches. In the embodiment shown in FIG. 3B, two optical interrupters, 346 and 348, are utilized. These interrupters are desirably positioned relative to a drive shaft used to raise/lower/open/close a window covering, or at the motor shaft. Further, interrupters 346 and 348 are configured such that their signals are not in phase with each other and can thereby be used to determine the direction of rotation of the drive shaft and the distance of travel of a window covering from a previous position. Also it is to be appreciated that either switch 346, 348 can be used to determine the relative position of the window covering (with respect to a top limit and/or a bottom limit) by providing pulses to the processor (as the window covering is moving) and the processor calculating the number of pulses in a given time to determine the opening or closing speed of the window covering. Pre-set positions can thereby be specified as an absolute number of pulses from a given reference, such as the top limit (i.e., when the bottom most member of a window covering is proximal a head rail for the window covering). Desirably, the window covering and control system therefore are programmed during assembly to include and specify these top/bottom and other intermediate locations. Alternatively, the control system can be programmed to learn "on the go" the top/bottom and other intermediate locations.

Resistors 350*m* 352, 354 provide power conditioning to the optical interrupters 346 and 348. In one embodiment, resistors 350 and 354 have a resistance of 68 ohms and resistor R4 has a resistance of 352 kilo ohms. Further, the optical encoders can be positioned proximal or distal to the processor 310, as particular embodiments of the present invention specify. The optical switches provide pulse signals to the processor on pins RA3 and RBO/INT. The processor can use these pulses to determine direction (up/down, clockwise/counter clockwise) of rotation of the shaft and/or distance of travel of the window covering (i.e., of the vanes) from a fixed reference location such as a head rail of the window covering. As stated above, different electrical components and/or ratings thereof, however, can be used for different embodiments of the present invention.

Control system further includes a board switch 356 which desirably effects the configuration of the processor 310. Likewise, a reset switch 358 can also be provided and upon activation resets the operations of the processor.

In one embodiment, visual output of status conditions is provided by light emitting diode(s) 360. 360's are connected to processor 310 via two 150 ohm resistors 362 and 364. As stated above, different electrical components and/or ratings thereof, however, can be used for different embodiments of the present invention.

The control system can also be configured to include a RS-232 (other suitable communication) port 366. The RS-232 signal can be modulated on the power supply, as desired. This port 366 can be electrically isolated from the processor by an optical isolator (not shown). Further, the RS-232 port can include a connection to a receive RX input pin and a transmit TX output pin on the processor 310. The RX pin can be used to program the processor, while the TX pin can be used to enable the control system to provide control and/or other signals to other devices, such as other window coverings, as desired. However, for at least one embodiment the TX pin is not utilized.

Also, the control system 300 can include, for various embodiments, various connections to an RS232 connector which facilitates the connection of the processor to an on-board program chip (when used) or other connections, such as a network for connecting and controlling multiple window coverings. In one embodiment of the present invention, an on-board program chip can be included and can be pre-programmed or programmed by a user so that the window covering operates according to desired presets, such as time of day, day of year, mood, and the like.

Further, by providing for the above mentioned power conditioning and regulation features, the control system 300 can be used with any standardized 12 VDC power supply. Likewise, the control system 300 can be combined to operate multiple shades, each of which can include their own position and/or rate detectors, motors, actuators, sensors and the like. Further it is to be appreciated that by using multiple encoders and motors a single processor 310 can control the movement of multiple window coverings such that all rise and/or fall in substantial synchronicity. The RS-232 or other connections can be used to connect the control system to the multiple window coverings. Such connections can also occur using wireless communications technologies, as desired. Likewise, multiple shades can be operated using a single control system and they can be separately driven, for example, by modulating control signals over power supply wires or otherwise.

Figure 4:
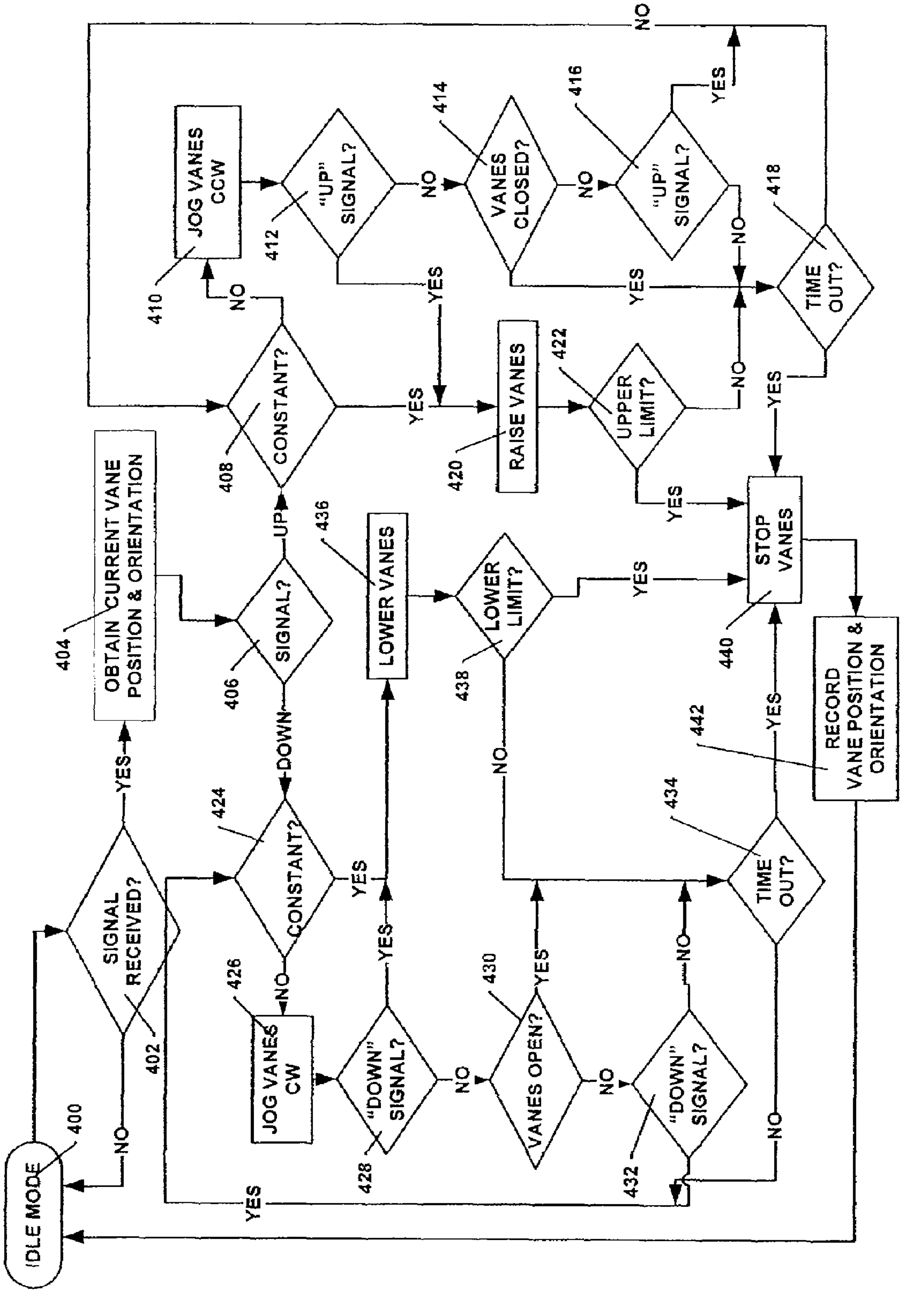
FIG. 4 is a flow diagram illustrating one method for using the control system of the present invention to control the operation of a window covering.

Referring now to FIG. 4, one embodiment of a method for using the control system 300 of the present invention is described. In this embodiment, the control system 300 commonly operates in a "power off" or "idle" mode (Operation 400) until a switch connected thereto is activated. By spending the majority of its time in idle mode, the control system, including the processor, motors, position detectors and the like desirably expend less energy. Such energy conservation can be important in battery and non-line powered embodiments. For example, a typical operating sequence can include: 1. power up; 2. move shade; 3. stop; 4. idle and 5. power off, where the idle time can be of a very short duration, such as a few milliseconds. Upon activation of the switch 302 (as shown in FIG. 3A) by selecting either a forward or reverse current flow, the processor P receives corresponding signals on pins 312 and 314 (Operation 402). Upon receiving such indication of switch activation, the processor recalls stored window covering location and position information (Operation 404). Depending upon the embodiment utilized, the processor can be configured to record the relative position of the bottom most member of the window covering relative to a head rail. For example, a window covering may be configured such that the bottom most member extends 100%, 75%, 50% or otherwise of its maximum extent from a head rail. Such positions can be determined, using the encoders, as a number of pulses such that, for example, a window covering extending 100% of its maximum extension might be associated with 1000 pulses, whereas one extending 75% of its maximum extension might be associated with 750 pulses. Thus, in at least one embodiment, the processor retrieves the current vane position of the window covering.

Likewise, the degree of tilt of the vanes can also be determined, stored and retrieved by the control system. For example, a window covering can be configured such that the vanes permit a certain amount of light into a room, the encoders can measure such configurations by associating a certain number of encoder pulses, for a given extension of the window covering. For example, a translucence of 100% (i.e., no light being blocked by the vanes) or a "full open" mode for a fully extended shade might correlate to a pulse count reading of 1000. Similarly, a translucence of 50% for a fully extended shade might correlate to a pulse count reading of 950 or 1050, wherein the 50% translucence is adjusted by rotating the shaft counter clockwise or clockwise and thereby changes the orientation of the vanes and the translucence of the window covering. Thus, the processor can be configured to use the saved current vane position and orientation information, in controlling the operation of window covering.

As shown in FIG. 4, the process for this embodiment also includes the operation of determining whether the switch signal was activated in a forward (or "up") direction or a reverse (or "down") direction (Operation 406). For the embodiment shown in FIGS. 3A and 3B, this determination can be based upon the values reported on pins 312 and 314.

It is to be appreciated that a window covering having adjustable height and adjustable translucence can reside in any of many possible states. For example, in a first position, the vanes can be fully extended and can point in a fully closed downward direction (i.e., rotated approximately 180 degrees from vertical) and thereby block a substantial portion of the incident light from entering the room. In a second position, the vanes can be fully extended and point in a fully closed upward direction (i.e., rotated approximately 0 degrees), and again block a substantial portion of the incident light from entering the room. In a third position, the vanes can be fully extended and rotated at some angle between 0 and 180 degrees (i.e., the vane tilt is partially upwards, neutral, or partially downwards) respectively. Further, any number of positions can be created by having the vanes extended to any permitted amount (between full and no extension) and the vanes rotated between 0 and 180 degrees.

Thus, to accommodate these multiple configurations and options based thereon, the processor 310 determines in which configuration the window covering currently is in and based thereon determines the desired action to be performed.

For example, when receiving an "up" signal, for at least one embodiment, the processor 310 determines how the vane is to be adjusted: a) to allow more light into the room (when the vanes are in the first position); b) to allow less light into the room (when the vanes are in the third position); and/or c) to raise the vanes and/or adjust the vane tilt (when the vanes are in the n'th position). In one embodiment, these determinations are made by the processor 310 determining whether a constant "up" switch signal has been received for a given period of time (for example, for 2 seconds) (Operation 408).

More specifically and in at least one embodiment, the control system 310 can be configured such that a constant positioning of the switch (in either an "up" or a "down" position), results in a command being sent to the control system that the user desires to raise or lower the vanes instead of adjusting the tilt thereof. Similarly, a pulsing or momentary "up" activation of the switch can be interpreted as a command to change the orientation of the vanes in an "up" or counter clockwise direction. When a momentary "up" signal (i.e., a "jog") is received, the processor instructs the motor to rotate a given number of encoder pulses in a given direction, which in this example is counter clockwise (Operation 410). This jogging results in a change in the orientation of the vanes, for example, from 180 to 175 degrees (where each "jog" results in a 5 degree change in the vane tilt). It is to be appreciated that a jog can be configured to result in any given angular rotation of the vanes, as desired by any embodiment of the present invention.

Upon completing the "jog," the processor 310 can be configured to determine whether the vanes are now to be raised by the presence of a constant "up" signal. (Operation 412).

The process can also be configured to include a determination as to whether the vanes are closed based upon the jog step (Operation 414). This step can be provided in order to minimize the stress upon window covering components such as guide wires (holding vanes), motors and the like. Further, if the maximum (O degree) closer position has not been reached, the process can be configured to continue with awaiting further momentary up signals, sent via the switch by the user (Operation 416). That is, upon receiving a subsequent "up" signal, the control system 300 continues to jog the vanes in the counter clockwise direction and thereby adjust the tilt of the vanes until the desired tilt is achieved. Further, this "jogging" of the vanes can be configured in at least one embodiment to occur within a given quantity of time, as specified for example by a watch dog timer or the like and as monitored by the processor in optional Operation 418.

Further, upon the vanes reaching a closed condition (as in Operation 414), the process can be configured to allow the user to then raise the vanes as specified in Operations 412-420 should a time out not occur (as determined in Operation 418) and a constant "up" signal is subsequently received, as per Operation 412.

More specifically, Operation 420 results in the raising of the vanes whenever and as long as a constant (for this example, greater than 2 seconds) "up" signal is received. It is to be appreciated that a user may desire to adjust the extension of the vanes before or after adjusting the tilt of the vanes. As such, in other embodiments, the process flow can be modified accordingly to address such sequence of operations.

During the adjusting the extension of the vanes, by raising them (as desired), the processor 310 desirably keeps track of the relative extension of the window covering and determines when a previously determined upper limit is to be reached (Operation 422). In some embodiments, the processor can be configured to adjust the rate of raising of the window covering as it approaches an upper limit, or any other preset extension limit. That is, a gradual slowing approach can be used to control the raising/lowering of the window coverings. Such gradual slowing can include the use of pulse width modulation on line 326 (as shown in FIG. 3A).

Upon the window covering reaching its desired extension and/or vane tilt, current can be applied via the braking transistors 318 and 320 to stop the tilting and/or extending of the window covering. Alternatively and/or additionally, the control of the window covering can be accomplished by turning off the power to the shade. The brakes can be configured as default to on braking systems where upon losing power to the transistors 318 and 320, the brakes are automatically applied. Other braking mechanisms can be used in other embodiments of the present invention.

Referring again to Operation 406, when a "down" signal is received, the control system responds in like manner to the previously described above processing of "up" signals (both constant and "jog" signals). That is, the processor determines whether the signal is constant (Operation 424). If a constant signal is not received, the processor jogs the tilt of the vanes in a clockwise direction (Operation 426). If a constant signal is initially or subsequently (Operations 428 and 432) received, the control system lowers the vanes (Operation 436). The processor can also be configured for "down" operations to determine when the vanes are fully open (i.e., have reached a 90 degree tilt angle) (Operation 430) or otherwise reached a desired tilt angle (not shown in FIG. 4). Also, the processor can be configured to detect when the window covering extends to a lower limit condition (Operation 438). Brakes can also be applied to control the "down" operations (Operation 440).

Upon the window covering reaching a desired configuration, via for example one or more constant and/or jog inputs specified by a user of the switch, the current values of the extension (i.e., vane position) and tilt (i.e., vane orientation) can be written to memory (Operation 442). It is to be appreciated, however, that vane position and/or orientation information can be written to memory during extension and/or tilt operations and/or otherwise.

At this point of the process the window covering has desirably reached the desired configuration of extension and orientation and resumes idle mode (Operation 400).

Figure 5:
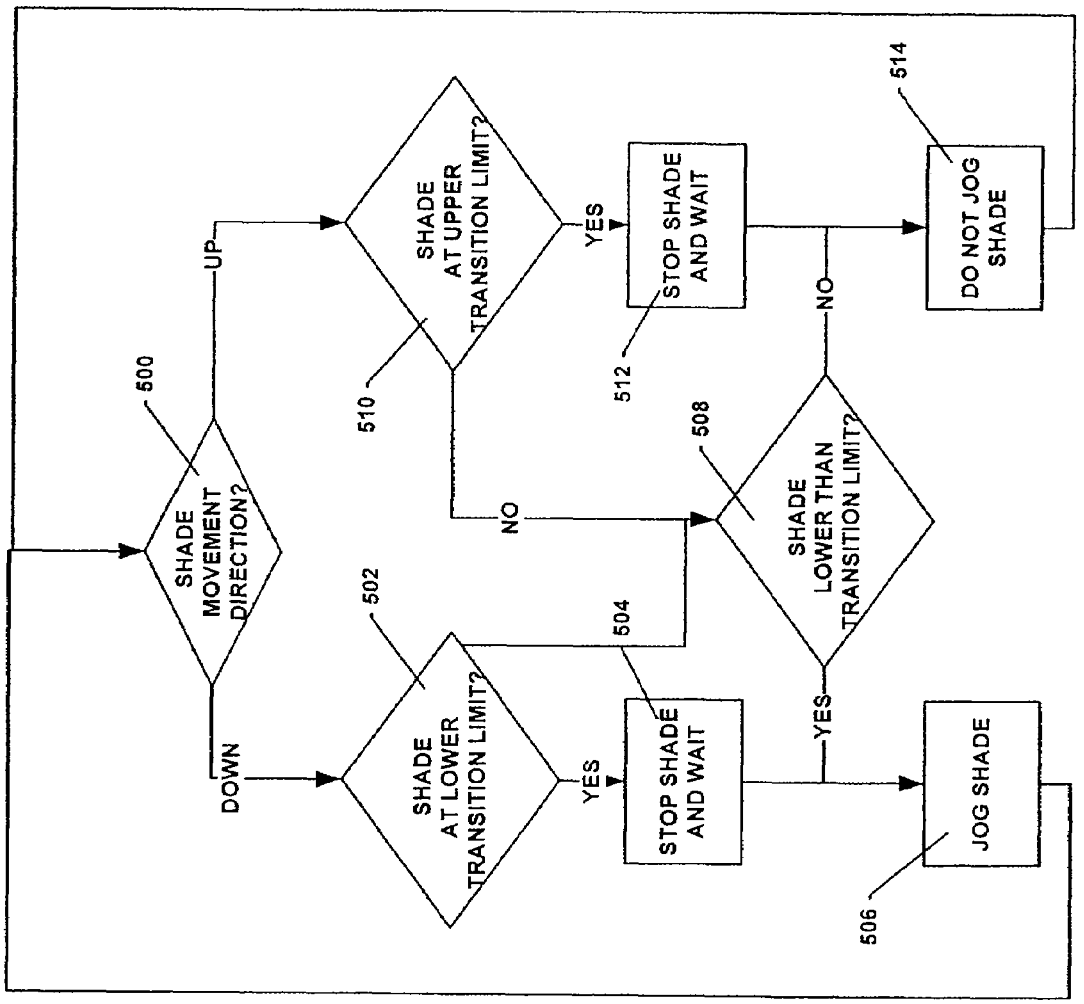
FIG. 5 is a flow diagram illustrating one method for controlling the jogging of a shade during operation of a window covering configured for use with one embodiment of the present invention.

Referring now to FIG. 5, one embodiment of a method for controlling the jogging of a shade during operation of a window covering configured for use with one embodiment of the present invention is shown. It is to be appreciated that various embodiments of the present invention can be configured such that the control systems "jogs" a shade into its final position as a predetermined final position point is approached. For at least one embodiment, the method shown in FIG. 5 is implemented whenever the motor is raising, lowering, tilting or otherwise adjusting the location and/or orientation of a shade. As shown, this embodiment begins with a determination of the direction of movement of the shade (Operation 500). If the shade is moving downward (or, a vertical blind to a fully extended position), a determination is made as to whether the shade is "close" to or at a lower transition limit (Operation 502). For one embodiment, a shade is determined to be "close" to a lower transition limit when it is 50 pulses from a fixed reference point, such as, a bottom limit. Alternatively, a shade can be determined to be "close" to a transition limit whenever a given number of pulses from an optical encoder (or other sensor) have been received by the processor 310 (see FIGS. 3A-3B). If the shade is "close," movement of the shade is stopped for a predetermined time period (Operation 504). During this time period, the control system waits to see if switch 302 is still activated (in a downward direction) and thereby indicating that the operator desires to not only lower the shade but to also jog the shade open, for example to let some, but not all, light in. The length of time during which this wait period occurs is desirably, for at least one embodiment of the present invention, 1500 milliseconds. Other wait time periods can be used for other embodiments.

Upon the wait period expiring, the control system starts to jog the shade open (Operation 506). The jogging of the shade desirably occurs, for at least one embodiment, such that each "jog" occurs once every 300 milliseconds, thereby allowing the user to release the switch and terminate the jogging function at various desired angles of vane tilt. Alternatively, the jogging function can be programmed such that vane tilts occur at preset values, such as 10 degrees open, 30 degrees open, 50 degrees open, 90 degrees open and the like.

Referring again to Operation 502, if the shade is not close to or at the lower limit, then a determination is made as to whether the shade is lower than the transition point (Operation 508). One instance where the shade can be lower than the transition point is during jogging functions. That is, after jogging begins, the operation flow generally proceeds through Operations 500-502-508-506 and then repeats until the operator releases the switch or the shade is fully extended and the vanes are opened to a maximum amount (generally between 90 degrees and 180 degrees), which ever occurs first.

Referring again to Operation 500, for at least one embodiment of the present invention, when the switch is configured in an "up" location (so as to raise or retract the shade), the process flows from operation 500 to operation 510, at which instance a determination is made as to whether the shade has reached an upper transition limit. If so, the movement of the shade is stopped and operations cease for a given wait time period (Operation 512). As above for down operations, this wait time period can very by embodiment, but, generally provides time for a user to indicate that tilting of vanes is desired. However, "up" operations vary from "down" operations by providing that the vanes are not jogged when an upper transition limit has been reached (Operation 514). This lack of jogging past an upward transition point is desirably provided in order to prevent damage to the vanes, the motor and/or the window covering when the vanes are fully retracted.

Referring again to operation 510, when the shade is not "close" to or at the upper transition limit (where "close" can be predetermined and defined based upon the implementation used) the operation continues with determining whether the shade is lower than the upper transition limit (Operation 508). If so, then tilting and (thereby raising) of the vanes occurs until the shade reaches the upper transition limit. Thus, it is to be appreciated that the foregoing description of one "jog" mode embodiment of the present invention, provides for the controlled "jogging" of a shade's vanes as the shade approaches upper and/or lower transition limits. Other embodiments of the present invention can also provide for the "jogging" of the shade between upper and lower transition limits, for example, by detecting a pulsing of the switch (versus a continuous hold) by an operator, or otherwise.

Figure 6:
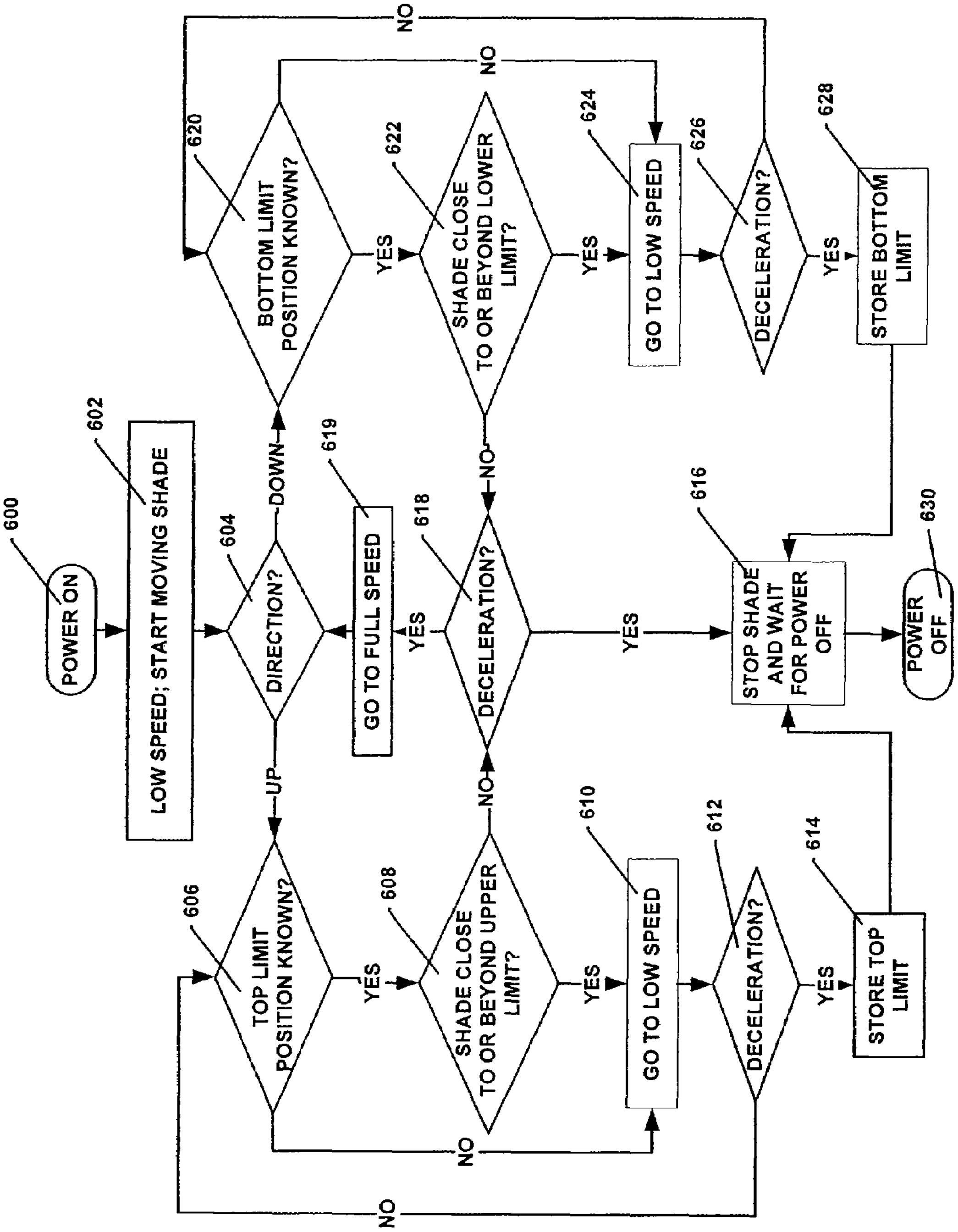
FIG. 6 is a flow diagram illustrating one method for controlling limits of a shade's movement during operation of window covering configured for use with one embodiment of the present invention.

Referring now to FIG. 6, one embodiment of a method for controlling limits of a shade's movement during operation of window covering configured for use with one embodiment of the present invention is shown. As shown, this process begins with power being applied to the switch (and thereby to the control system) (Operation 600). At this instance, the processor configures the motor for slow speed and begins moving the shade (Operation 602). The process continues with the processor verifying, using signals provided by the optical encoders, whether the shade is moving in an "up" (retract) or "down" (extend) direction (Operation 604). As should be readily apparent, the process is essentially identical for "up" or "down" operations, with the detection of hard limits and the setting of soft limits by the processor 310 in the EEPROM. Therefore, for purposes of simplicity, the following discussion is with respect to only the "up" operation and corresponding operations for "down" operations are designated by italics (i.e., "Operation 606/620).

Referring now to Operation 604, the process continues for "up" operations with determining whether the "top" limit position is known (Operation 606/620). In one embodiment, the processor queries an EEPROM (or other data storage device in communication with the processor) for any stored "top" limit positions. These "top" limit positions can be indicative, for example, a given number of pulse counts of a the motor, when a DC stepper motor is used to control the operations of a window covering. Other indicators can also be used as desired.

If the "top" limit position is known, then a determination is made as to whether the shade is close to, at or beyond the top limit position (Operation 608/622). If so, the motor is configured into slow speed (Operation 610/624) until a deceleration occurs (due to the resistance of the shade vanes as they come into contact with each other) (Operation 612/626). At this instance the "top" limit position is noted and saved in a data storage device or memory for future use (Operation 614/628). The shade is then stopped, and upon a wait period expiring (Operation 616), the shade is powered off (Operation 630). It is to be appreciated that the wait period can vary from zero seconds to any desired length of time. However, the wait period generally does not extend for more than 60 seconds, which provides a user with sufficient time to lower (or raise) the shade before the motor is powered off, while also minimizing the time that the control system, motor and other components are powered and draining battery life and/or otherwise expending energy.

Referring again to Operation 606/620 when the "top" position is not known, the process desirably proceeds to configuring the shade in low speed mode and performing Operations 610/624 to 612/626 to 614/628 to 616 to 630.

Referring again to Operation 608/622, when the shade is moving in an "up" direction, the "top" limit position is known, and the shade is not "close" to, at or beyond the "top" limit position, the process proceeds from Operation 608/622 with determining whether the motor is decelerating (as discussed above)(Operation 618). If so, the shade is stopped, the wait period occurs and the control system, motor and components are powered off (Operations 616 to 630). Referring again to Operation 618, if the motor is not decelerating, then the motor is configured into full speed mode (Operation 619). The process then continues with full speed mode until the processor detects that the shade is “close” to, at or beyond the “top” limit or until a deceleration occurs, as specified in Operations 606/620 to 608/622 to 618. Thus, it is to be appreciated that the various embodiments of the present invention provide for methodologies for controlling the operation of a window covering by utilizing software detected limits for both up and down locations.

Therefore, it is to be appreciated that the various embodiments of the present invention provide a control system and method that can control the operation of a window covering using only a two line switch. It should be further appreciated that various embodiments may be employed with any covering for any architectural opening, not just window coverings. For example, alternative embodiments may be used to raise and lower drapes, awnings and the like. While the present invention has been described above with respect to various system and process embodiments, it is to be appreciated that the present invention is not so limited and includes those other systems and method embodiments covered by the full scope and breadth of the following claims.

The invention claimed is:

1. A control system for use in controlling the extension and orientation of a window covering comprising:

at least one vane moving element operative to adjust a position of a plurality of vanes in the window covering;

a shaft connected to the motor;

one or more optical or magnetic switches operably coupled to the shaft and operative to detect at least rotation of the shaft;

a dipole switch;

a control circuit operably connected to the dipole switch;

wherein the control circuit is configured to determine the direction and duration of current flow from the switch to the at least one vane moving element and further operable to control either extension or rotation of the vanes in the window covering based on the duration of current flow from the switch to the at least one vane moving element.

2. The control system of claim 1, wherein the one or more optical or magnetic switches are configured to operate as an encoder.

3. The control system of claim 2, wherein the one or more optical or magnetic switches further detect a direction of rotation of the shaft.

4. The control system of claim 3, wherein the motor may raise, lower and change the orientation of the plurality of vanes when it adjusts the position of the plurality of vanes.

5. The control system of claim 1, wherein the control circuit is operably connected to the dipole switch by a two wire circuit.

6. The control system of claim 1, wherein the at least one vane moving element is one of a motor and a rotor.

7. The control system of claim 1, wherein the control circuit comprises:

a processor; and a memory operably connected to the processor; wherein the memory is operative to store a position and orientation of the plurality of vanes.

8. A method for adjusting a covering for an architectural opening, comprising:

obtaining a current position for the covering;

receiving a control signal;

determining if the control signal is constant for at least a minimum time;

in the event the control signal is constant for at least the minimum time, adjusting the covering in a first manner;

determining if a limit on the position of the covering has been reached;

in the event the limit on the position of the covering has been reached, stopping adjusting the covering in the first manner; and recording a final position of the covering, wherein in the event the control signal is not constant for at least the minimum time, jogging the covering.

9. The method of claim 8, further comprising:

in the event the control signal is not constant for at least the minimum time, jogging the covering;

receiving a second control signal;

determining if the second control signal matches the first control signal;

in the event the second control signal matches the first control signal, adjusting the position of the covering in a second manner.

10. The method of claim 9, wherein the operation of jogging the covering comprises moving the covering up and down briefly so as to change the orientation of the covering.

11. The method of claim 9, wherein the operation of adjusting the position of the covering comprises adjusting a height of at least a portion of the covering.

12. The method of claim 11, wherein:

the covering is a window shade comprising a plurality of vanes; and the at least a portion of the covering comprises the plurality of vanes.

13. The method of claim 12, wherein:

the operation of adjusting the covering in the first manner comprises raising the covering; and the operation of adjusting the covering in the second manner comprises opening the vanes.

14. The method of claim 12, wherein:

the operation of adjusting the covering in the first manner comprises lowering the covering; and the operation of adjusting the covering in the second manner comprises closing the vanes.

15. The method of claim 9, further comprising:

in the event the second control signal does not match the first control signal, determining if at least a portion of the covering occupies a maximum position;

in the event the at least a portion of the covering does occupy a maximum position, stopping adjustment of the covering.

16. The method of claim 15, wherein:

the at least a portion of the covering is a vane; and the maximum position is a fully open position.

17. The method of claim 15, wherein:

the at least a portion of the covering is a vane; and the maximum position is a fully closed position.

18. The method of claim 9, wherein the operation of adjusting the covering in the second manner comprises adjusting a rotational position of the covering.

19. The method of claim 9, further comprising:

determining if the control signal signifies motion of the covering in an upward direction;

in the event the control signal does not signify motion of the covering in an upward direction, interpreting the control signal to signify motion of the covering in a downward direction.

20. A control circuit for use in controlling the extension and orientation of a window covering comprising:

a processor operably connected to a motor configured to operate a shaft for adjusting a position of a plurality of vanes of the window covering;

a memory operably connected to the processor and operative to store a position and orientation of a plurality of vanes in the window covering;

one or more optical or magnetic switches operably coupled to the shaft and operative to detect at least rotation of the shaft; and a dipole switch operably connected to the processor and configured to power the control circuit in two flow directions;

wherein when the dipole switch is closed, a switch signal is transmitted to the processor to power the motor, and when the switch is open, power to the processor is terminated; and wherein the processor is configured to adjust either the position or the orientation of the plurality of vanes based on whether the switch signal has been received for a given period of time.

* * * * *